United States Patent [19]

Gamell

[11] 4,293,777
[45] Oct. 6, 1981

[54] TURBO-ELECTRIC POWER PLANT AND PROCESS

[75] Inventor: Joseph A. Gamell, Kalamazoo, Mich.
[73] Assignee: Joseph Gamell Industries, Inc., Kalamazoo, Mich.
[21] Appl. No.: 62,322
[22] Filed: Jul. 30, 1979
[51] Int. Cl.³ .......................... H02K 7/18; F01D 5/30
[52] U.S. Cl. ...................................... 290/52; 415/119
[58] Field of Search ................... 290/52; 415/90, 92, 415/205, 202, 53; 310/156, 154; 415/119

[56] References Cited

U.S. PATENT DOCUMENTS 2,743,375  4/1956  Parker ................................. 290/52
3,024,366  3/1962  Yanagimachi ....................... 290/2
3,157,793  11/1964  Adkins ................................. 415/90
3,938,905  2/1976  Wadensten ........................ 415/119

Primary Examiner—J. V. Truhe
Assistant Examiner—Donald L. Rebsch
Attorney, Agent, or Firm—Gordon W. Hueschen

[57] ABSTRACT

A turbo-electric power plant comprising a drag turbine with a hollow rotor in which are mounted the elements of an electric generator. The drag turbine is operated with a low-temperature propellant and the spent propellant is led out of the drag turbine in heat exchange with the elements of the generator. The drag turbine is propelled by a plurality of jets which are supplied from a manifold encircling the turbine which continuously diminishes in cross-section throughout 360 degrees.

18 Claims, 12 Drawing Figures

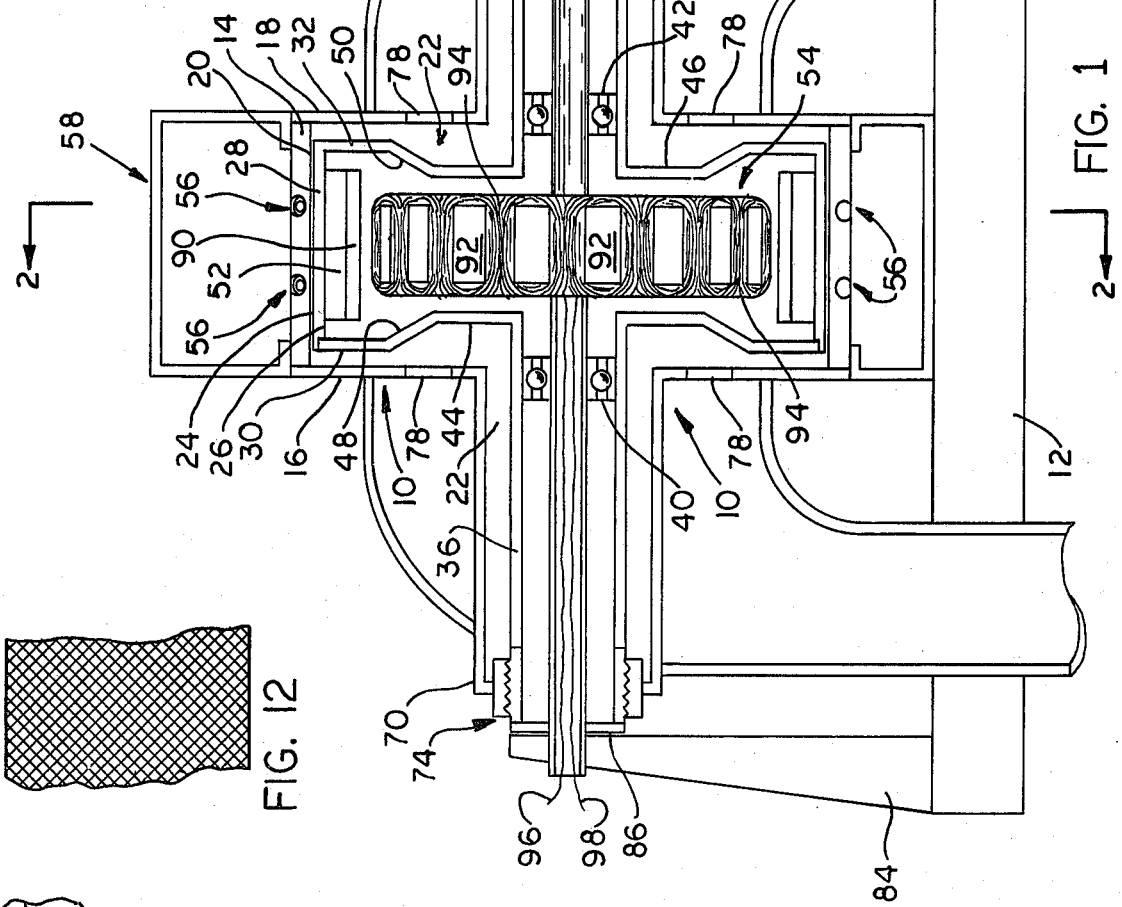

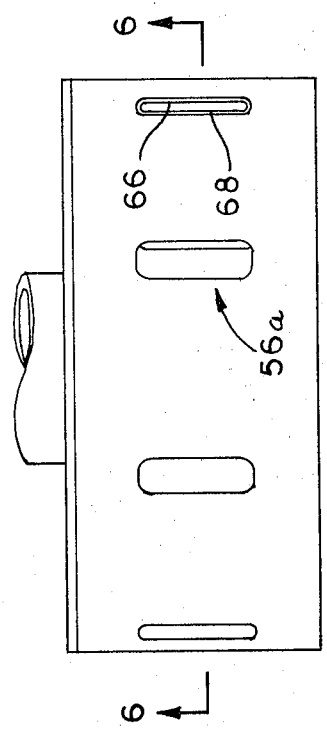
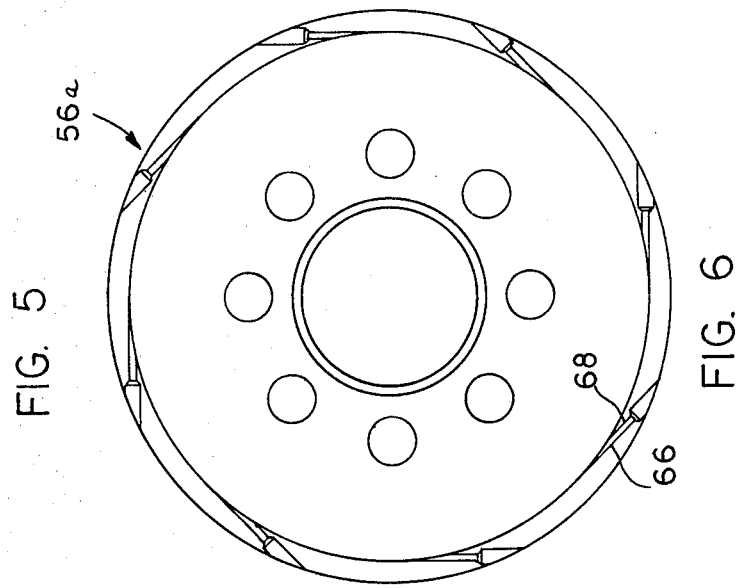
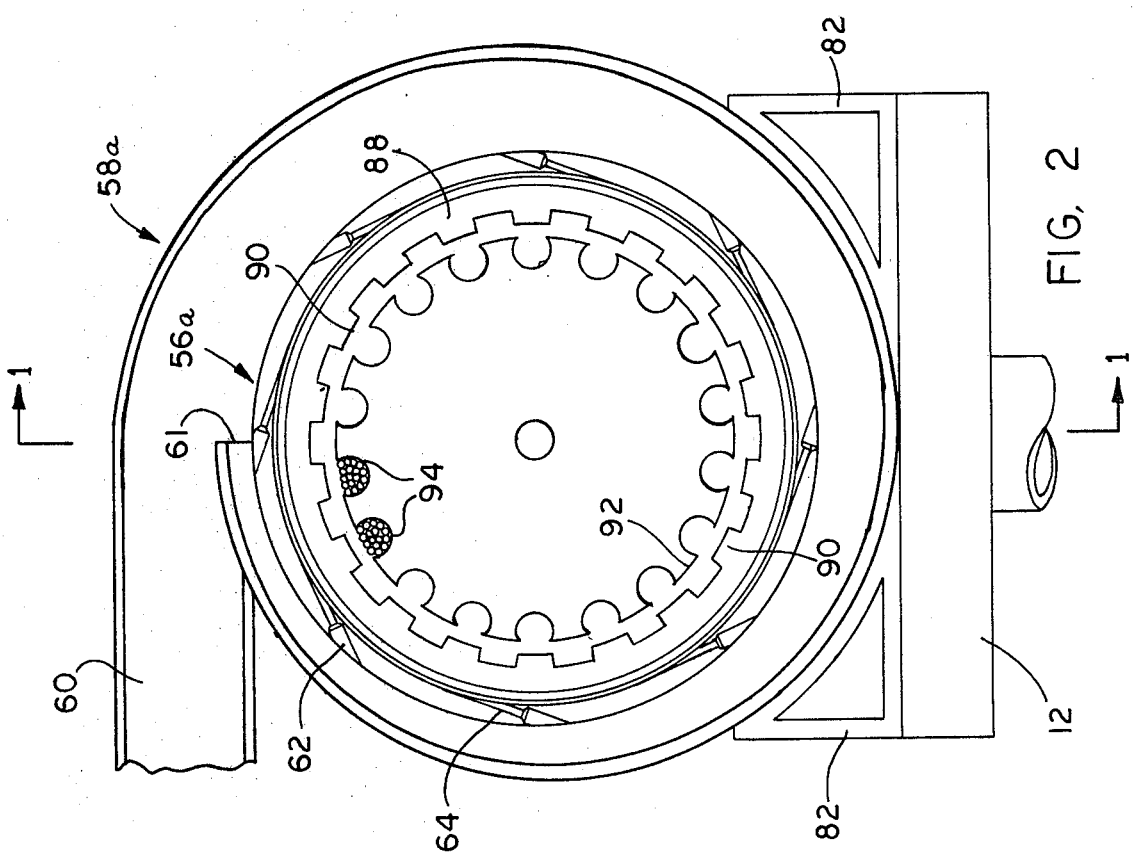

TURBO-ELECTRIC POWER PLANT AND PROCESS

FIELD OF INVENTION AND PRIOR ART

This invention relates to a process and apparatus for generating electric power and is particularly directed to a turbo-electric power plant and process as well as to improvements in the turbine used in the combination and process.

Various types of turbines have been used and proposed heretofore for driving electric generators. Generally speaking, they are either water-driven or steam-driven turbines. It does not appear, however, that the so-called drag turbines have heretofore been adapted to or used for this purpose. The so-called drag turbines heretofore available have not been sufficiently efficient in their operation when made of a size suitable for driving an electric generator. Thus, while drag turbines, or pseudo-drag turbines are known in the art, for example, U.S. Pat. Nos. 2,325,530, 3,870,282, 3,932,057, and 3,938,905, they are not particularly adapted for use with electric generators.

OBJECTS OF THE INVENTION

It is an object of the invention to provide an improved drag turbine which is well adapted for use in generating electricity. It is a further object of the invention to provide an improved power plant. It is still a further object of the invention to provide an improved process for generating electricity. Other objects are to avoid the disadvantages of the prior art and to obtain such advantages as will appear as the description proceeds.

BRIEF DESCRIPTION OF THE INVENTION

The invention relates to an improved turbo-electric power plant and process in which an electric generator is driven by a drag turbine operated by a low-temperature propellant fluid and in which the spent propellant fluid is discharged in heat exchange relation to the electricity-generating elements of the turbine in order to cool the same. More particularly, the invention relates to a turbo-electric power plant in which a stationary housing is supported by a base member and has an annular member provided with depending sides which form with the annular member an annular channel and in which the annular channel has a smooth cylindrical inner surface; in which a hollow rotor is mounted for rotation in the housing about the axis thereof, with the outer portion thereof disposed in the annular channel and has a roughened outer cylindrical surface and sides conforming essentially to the shape of the annular channel and in which the hollow rotor has an inner cylindrical surface in the outer portion thereof which is concentric with the other cylindrical surfaces; in which electricity-generating elements are disposed in the hollow rotor in electric-generating relation to each other, one of which is affixed to the inner cylindrical surface of the rotor and functions as the rotor element of the electric generator, and the other of which is anchored to the base member and functions as the stator element of the electric generator; in which a plurality of jet orifices are disposed in and around the annular member and oriented to jet propellant fluid into the space between the smooth inner cylindrical surface of the annular channel and the apposed roughened outer cylindrical surface of the hollow rotor and onto the roughened outer surface; in which outlet means are provided at spaced intervals around and in the walls of the housing below the annular channel, whereby propellant fluid jetted onto the roughened outer surface fans out to the edges thereof and moves down between the sides of the annular channel and the sides of the outer portion of the hollow rotor and out said outlet means, thereby functioning as a coolant for cooling the electric generator elements; and in which collecting means is provided for collecting the electricity generated by the electric generator elements and leading it to the exterior of the housing.

The electricity-generating elements may comprise electrical windings on either the stator element or the rotor element, or both.

Advantageously, the stator of the electric generator is mounted on a stationary axial shaft on which the hollow rotor is mounted for rotation. If the stator element of the electric generator has electric windings, the collecting means comprises lead wires which pass out through an axial bore in the axial shaft. If the rotor element of the electric generator comprises electrical windings, the collecting means comprises commutator elements electrically connected with said windings and brushes which contact the commutator elements and are electrically connected directly to lead wires that lead out through the axial bore in the axial shaft.

Advantageously, also, the jet orifices angle through the annular member in the direction of rotation of the hollow rotor so that the propellant fluid is jetted onto the roughened outer cylindrical surface of the hollow rotor and into the space between the two apposed cylindrical surfaces; an annular manifold surrounds and is in communication with the jet orifices and is provided with propellant fluid inlet means arranged to direct propellant fluid into the manifold substantially tangentially in the direction of rotation of the hollow rotor; the manifold continuously diminishes in cross-section in the direction of flow-through a full 360 degrees; the manifold at the 360 degree point is open so that the propellant can continue to flow round and round in the manifold and all of the jet orifices are exposed to this continuous flow of propellant.

Advantageously, also, the jet orifices have their outermost surface tangential to the smooth inner cylindrical surface of the annular channel whereby a portion of the fluid is jetted tangentially into the space between the two apposed surfaces to form a drag stream around the hollow rotor and another portion impinges on the roughened outer cylindrical surface of the hollow rotor where it imparts energy thereto by impact or reaction and is drawn into the drag stream where it, together with the portion jetted in tangential function to drag the rotor around with it.

Additional features of the invention will appear in the detailed description.

BRIEF DESCRIPTION OF THE DRAWINGS

In the drawings:

FIG. 1 is a cross-sectional view in side elevation taken along line 1—1 of FIG. 2.

FIG. 2 is a cross-sectional view in front elevation taken along line 2—2 of FIG. 1.

FIG. 5 is a side elevation of a modified form of FIGS. 1-4 with the manifold and hollow rotor removed.

FIG. 6 is a cross-sectional view in front elevation taken along line 6—6 of FIG. 5.

FIG. 7 is a partial section taken along line 2—2 of FIG. 1.

FIG. 8 is a partial section of a modified form of FIG. 7.

FIG. 9 is a partial section of another modified form of FIG. 7.

FIGS. 10, 11, and 12 are partial views showing a modified form of the roughened surface of the rotor.

DETAILED DESCRIPTION OF THE INVENTION

FIGS. 1 and 2 illustrate a form of the invention particularly designed for use with a hydraulic propellant, such as water. It is especially useful for the production of hydro-electric power in conjunction with small dams, but is not limited thereto.

Figure 4:
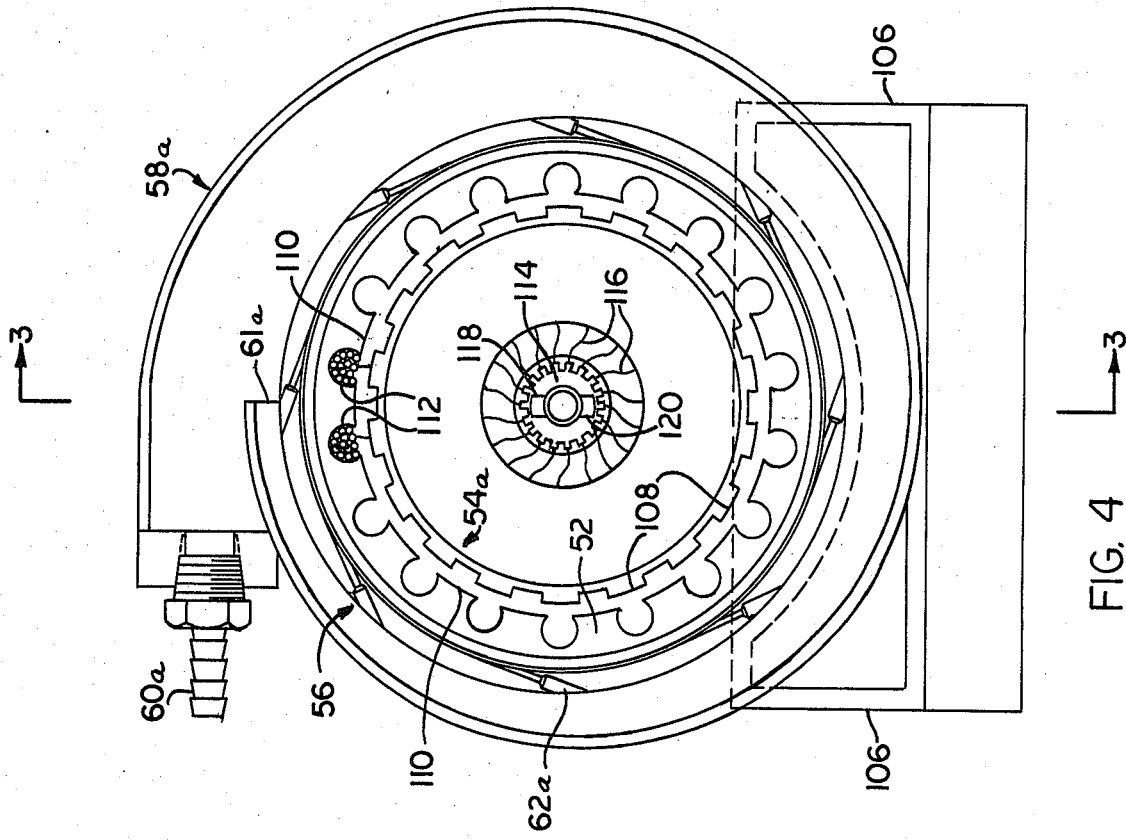
FIG. 4 is a cross-sectional view in front elevation taken along line 4—4 of FIG. 3.
Figure 3:
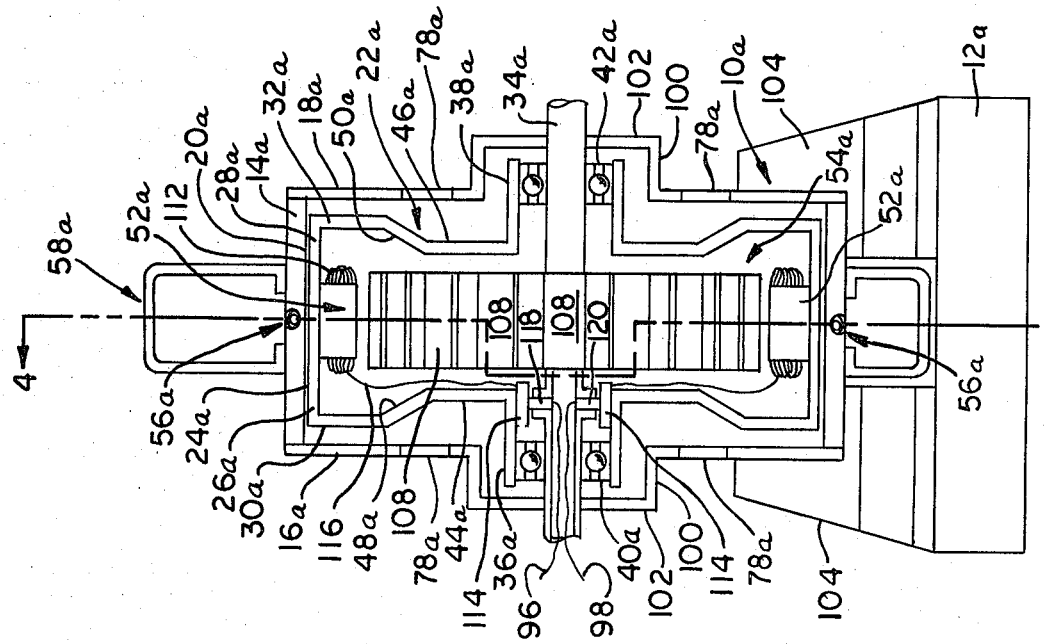
FIG. 3 is a cross-sectional view in side elevation of another form of the invention taken along line 3—3 of FIG. 4.

FIGS. 3 and 4 illustrate a form of the invention suitable for use with a gaseous propellant, such as compressed air, steam, or the like. In the following description, the common features of the two forms will be described first; then the differences; then the variants shown in the other figures. Like parts will be designated by the same numbers with an "a" added. Where an unqualified number is used, it is to be applied to both forms, if applicable.

In FIGS. 1 through 4, numeral 10 designates a stationary housing supported on a base 12. The housing 10 has an annular member 14 having depending sides 16 and 18 which form with the annular member 14 an annular channel. The annular channel has a smooth inner cylindrical surface 20. The term "cylinder" and its derivatives, as used herein, unless otherwise indicated, has reference to a right cylinder.

Inside of the housing 10 is disposed a hollow rotor 22 which has a roughened outer surface 24 apposed to the smooth inner surface 20 of the annular member 14 and a cylindrical inner surface 26 separated from the roughened cylindrical surface 24 by a relatively thin annulus 28. Depending from the edges of the annulus 28 are sides 30 and 32, which, together with the annulus 28, form the upper portion of the hollow rotor 22 which corresponds essentially in shape to the shape of the annular channel of the housing 10. The smooth inner cylindrical surface 20 is close to but spaced from the roughened outer surface 24 of the hollow rotor 22, as will be described more particularly later. Similarly, the sides 16 and 18 are spaced from the sides 30 and 32, respectively, for purposes that will be discussed later.

The hollow rotor 22 is mounted for rotation on a transverse axial shaft 34. To this end, there are provided opposed axial drums 36 and 38, which are mounted on bearings 40 and 42 for rotation on the axle 34. Extending upwardly from the inner ends of drums 36 and 38 are sides 44 and 46, respectively, which are connected to the sides 30 and 32 by outwardly-flaring segments 48 and 50 respectively. All the walls of the hollow rotor are impervious to gas and moisture, as are the walls of the housing.

Inside of the hollow rotor 22 are the elements of an electric generator. These include an annular element 52 affixed to the inner cylindrical surface 26 and a coaxial cylinder 54 anchored on the axial shaft 34 which, in turn, is anchored to the housing or base, so that the cylinder 54 is always stationary. Electrical windings are provided on either the stator element or the rotor element, or both, and collector means is provided for collecting the electricity generated and leading it to the exterior of the housing, as will be described in more detail later.

A plurality of jet orifices 56 are provided in the annular member 14 for jetting propellant fluid into the space between the two apposed cylindrical surfaces 20 and 24. Around the annular member 14 is disposed an annular manifold 58 connected with propellant fluid inlet means 60 and in open communication with each of the jet orifices. The jet orifices are slanted in the direction of the desired rotation of the hollow rotor and the manifold continuously diminishes in cross-section in the same direction through a full 360 degrees to an open end 61 at the inlet end of the manifold, the 360 degree point, i.e., at the beginning and the end of the taper, which open end permits whatever propellant fluid that has not passed through the jet orifices to pass into the inlet end of the manifold and make another pass therein. The flowing of the propellant fluid from the inlet means over this open end acts as an aspirator and promotes circular flow in the manifold. Thus, the propellant fluid introduced into the manifold circulates about the annular member, assuring a uniform supply of propellant fluid to the jet orifices.

The jet orifices 56 comprise an enlarged bore 62, which functions as a starter bore, and a small bore 64, which functions as the jet proper. The bores may be cylindrical bores as in FIGS. 1 through 4, or flat bores as in FIGS. 5 and 6. In either case, the uppermost surface elements, the uppermost element of the cylindrical bores, or the uppermost flat surface of the flat bores, are tangential to the smooth inner cylindrical surface 20 and the diameter or minor axis of the bores are greater than the space between the two apposed surfaces 20 and 24, whereby a portion of the propellant fluid is jetted tangentially into that space to form a drag stream around the hollow rotor and the balance impinges on the roughened surface 24 where it imparts energy thereto by impact or reaction, and is drawn into the drag stream where it combines with the portion jetted in tangentially, to form a drag stream, which acts to drag the rotor around.

The arrangement of the jet orifices and the manifold just described causes the propellant fluid to be introduced into the manifold tangentially on the direction that it flows out through the jet orifices and the continuously diminishing cross-section of the manifold tends to insure that the propellant fluid pressure is essentially the same at all of the jet orifices.

There may be a single set of jet orifices in the annular member 14, as shown in FIGS. 3 and 4, or there may be a plurality of sets of jet orifices in the annular member 14, as shown in FIGS. 1 and 2. A like effect as that obtained by a plurality of sets of jet orifices is obtained by a single orifice which is flattened transversely, as shown in FIGS. 5 and 6, to provide flat upper and lower surfaces 66 and 68, respectively, which have the same spacing (with the minor axis) as in the case of a cylindrical bore with the flat upper surface being at a tangent to the smooth inner cylindrical surface 14.

In the modification shown in FIGS. 1 and 2, the sides of the housing 10 extend downward to drums 70 and 72, which are rotatably sealed to the drums 36 and 38, respectively, by the brush seals 74 and 76. These brush seals are effective to prevent leakage of hydraulic liquid because the bulk of the liquid is kept out of contact therewith by centrifugal force, and that which does contact the brush seal has so little head pressure, that leakage is no problem. The spent propellant liquid exits through a plurality of vent apertures 78, in the sides of the housing 10 into sewer connectors 80, which pass down through the base 12 to the sewer. The apertures 78 are kept below the upper portion of the hollow rotor so that the propellant liquid must pass down in heat exchange relation to the electric generator elements 52 and 54. The propellant fluid, which ordinarily will be ambient water taken from a stream or reservoir, thus acts as a coolant for the elements of the electric generator. Also, by locating the vent apertures 78 above the drums 70 and 72, the propellant liquid is kept out of these drums by the centrifugal force engendered by the rotation of the hollow rotor 22.

The inlet 60, shown in FIG. 1, is connected to or is an extension of penstock tubes or like means for supplying hydraulic propellant fluid under pressure.

The housing 10 is supported by the base 12 with suitable pillow blocks 82 shaped to conform to the manifold 5, and the axial shaft 34 is held against rotation by braces 84 extending upwardly from the base 12. The braces, if desired, can have caps 86, which cover the open ends of the drums 36 and 38.

The rotor element 52 of the electric generator is an annular permanent magnet 88 affixed to the inner surface 26 of the hollow rotor 22, which annular magnet is provided with a plurality of poles 90 in a manner already well known in the art. The stator element 54 of the electric generator is provided with iron or other ferromagnetic poles 92, which are wound, as shown at 94, in a manner already well known in the art. These windings 94 are connected to two lead wires 96 and 98 in a manner such that alternating current is collected and led to the exterior of the housing 10 through an axial bore in the axial shaft 34. The lead wires 96 and 98 lead to a suitable convertor, not shown, but which is already well known to those skilled in this art. The function of the convertor is to convert the alternating current, AC, to direct curent, DC, and has the advantage that the speed of the drag turbine need not be controlled to produce an AC current of a particular frequency.

In the modification shown in FIGS. 3 and 4, the housing sides 16a and 18a extend down to drums 100, which are covered with face plates 102 to form a fluid-tight housing. The axial shaft 34a is welded to these face plates in order to anchor the stator 54a in stationary position. On the base 12 are suitable supports or pillow blocks 104 and 106 shaped to cradle and position the housing on the base in a stationary position.

The manifold 58a is constructed essentialy as shown in FIGS. 1 and 2, but is narrower; just wide enough to accommodate one series of jet orifices. Also, the inlet means 60a is such as would be customarily used with a compressed propellant gas, such as compressed air, or any other high-pressure gas, such as steam or other vapor. In the latter case, advantage of the cooling effect can only be obtained by the use of a low-boiling liquid, such as the fluorinated hydrocarbons, for example, Freon 114, and the like.

In this modification, the rotor is wound and the stator is not. Thus, the stator 54a is a permanent magnet having a plurality of polls 108 and the rotor 52a is provided with a corresponding number of polls 110, which are wound with the windings 112 in a manner already known in the prior art. The windings 112 are electrically connected to the elements of a commutator 114 by wires 116 in a manner already known in the art. The elements of the commutator are brushed by the brushes 118 and 120 which are electrically connected with the lead wires 96 and 98, respectively. In this form, direct current is collected and conducted to the exterior of the housing 10.

In a typical operation of the modification shown in FIGS. 1 and 2, high-pressure water is conducted from penstock tubes, or the like, to the inlet means 60 into the manifold 58, whence it is jetted through the jet orifices 56 onto the roughened outer surface of the hollow rotor 22, and tangentially into the space between the two apposed surfaces. The jetted fluid there forms a drag stream which fans out to the edges of the rotor and passes down between the sides of the rotor and the apposed sides of the housing, and then out through the vent apertures into the sewer connectors. The cold water which comes out of a penstock tube, even in the summertime, gives adequate cooling for the generator elements.

In a typical operation of the modification shown in FIGS. 3 and 4, propellant gas at a suitably high pressure is lead into the manifold 58a through the inlet means 60a to fill the manifold 58a. The high-pressure propellant gas then passes through the jet orifices 56a onto the roughened surface 24a, over to the edges thereof and down between the sides of the housing and the rotor, and out the vent apertures 78a. In its passage, the gas is expanded and cooled in the expansion, so that the cooling of the generator elements is increased by the cooling effected by the expansion.

The roughening of the outer surface 24 of the hollow rotor 22 can be accomplished simply by knurling or by scoring transverse lines across the surface, as shown in FIGS. 7 and 11, or transverse rectangular grooves, as shown in FIG. 8, or transverse saw teeth, as shown in FIG. 9. Instead of being transverse, the grooves, channels, or scoring can be arcuate, as in FIG. 10, or in a herringbone pattern, as in FIG. 11. In the case of the latter two, the jet advantageously is directed into the cups, or lowest points or nadirs of the curves, as shown in FIGS. 10 and 11. In this way, when the propellant fluid fans out toward the edges of the roughened surface, the fanning-out fluid tends to cross the grooves essentially at right angles thereto. If desired, radial fins or scoring can be formed on the sides 30 and 32 to increase the drag effect and to get the most energy possible out of the propellant fluid.

The depth of the grooves is not critical. However, it is neither necessary nor desirable for the depth of the grooves to be substantially more than the spacing between the two apposed cylindrical surfaces. The spacing between the two apposed cylindrical surfaces is critical, however, but must be determined by cut and try, according to the dimensions of the device. The important thing is the relation between the size of the bore and the spacing between the two apposed surfaces. Thus, the width of the bore from the bottommost element or surface to the uppermost one must be greater than the spacing between the two apposed surfaces. Also, the diameter or minor axis of the bore should be greater than the spacing between the transverse channels or scorings, so that the oblique opening of the jet orifice at the smooth inner surface 24 subtends a plurality of the transverse channels or scorings. In this way, a portion of the propellant fluid is jetted in tangentially into the space between the apposed surfaces to create a drag stream flowing between the two apposed surfaces and the balance is caused to impinge on the roughened surface of the rotor so as to effect an impact reaction between the jet and the rotor, thereby providing a strong starting torque on the rotor. As the rotor picks up speed, the portion so jetted onto the rotor surface is sucked into the drag stream and the combined propellant acts to drag the rotor around. Before, or by the time the next jet orifice is reached, the propellant fluid will have fanned out to the edges of the rotor where it will pass down between the sides of the housing and the rotor and out the vent apertures. Generally speaking, the diameter or width of the jet orifice is between 2 and 5 times, and advantageously, 4 to 5 times the width of the space between the two apposed surfaces, that is, the radial distance between the two surfaces.

It is to be understood that windings can be provided on both the stator and the rotor, if desired, and that slip rings can be substituted for the commutator, in which case, alternating current will be collected from the rotor windings.

It is to be understood that the invention is not to be limited to the exact details of operation or structure shown and described, as obvious modifications and equivalents will be apparent to one skilled in the art.

I claim:

1. A turbo-electric power plant which comprises
   (1) a stationary housing supported by a base member and having an annular member provided with depending sides which form with said annular member an annular channel, said annular channel having a smooth cylindrical inner surface;
   (2) a hollow rotor mounted for rotation in said housing about the axis thereof, with the outer portion thereof disposed in said annular channel and having a roughened outer cylindrical surface and sides conforming essentially to the shape of said annular channel, said hollow rotor having an inner cylindrical surface in said outer portion thereof which is concentric with the other said cylindrical surfaces;
   (3) electric generator elements disposed in said hollow rotor in electricity-generating relation to each other, one said element being affixed to the inner cylindrical surface of said hollow rotor and functioning as the rotor element of said electric generator, and the other said element being anchored to said base member and functioning as the stator element of said electric generator;
   (4) a plurality of jet orifices disposed in and around said annular member and oriented to jet propellant fluid into the space between the smooth inner cylindrical surface of said annular channel and the apposed roughened outer cylindrical surface of said hollow rotor and onto the said roughened outer cylindrical surface;
   (5) outlet means at spaced intervals around and in the side walls of said housing below the said annular channel, whereby the propellant fluid jetted onto the outer cylindrical surface of said hollow rotor, fans out to the edges thereof and moves down between the sides of said annular channel and the sides of the outer portion of said hollow rotor and out said outlet means, thereby functioning as a coolant fluid for cooling said electric generator elements; and,
   (6) collecting means for collecting the electricity generated by said electric generator elements and leading it to the exterior of said housing.

2. A turbo-electric power plant according to claim 1, in which the stator element of said electric generator is mounted on a stationary axial shaft and in which said hollow rotor is mounted on said axial shaft.

3. A turbo-electric power plant according to claim 1, in which said collecting means comprises wires which pass out through an axial bore in said axial shaft.

4. A turbo-electric power plant according to claim 3, in which the rotor element of said electric generator comprises electrical windings and in which said collecting means comprises commutator elements electrically connected with said windings and brushes which contact said commutator elements and are electrically connected to said wires, whereby DC current is collected.

5. A turbo-electric power plant according to claim 3, in which the stator element of said electric generator comprises electrical windings electrically connected directly to said wires, whereby AC current is generated and collected.

6. A turbo-electric power plant according to claim 1, in which said jet orifices angle through said annular member in the direction of rotation of said hollow rotor, whereby the propellant fluid is jetted onto the roughened outer cylindrical surface of said hollow rotor and into the space between the two apposed cylindrical surfaces.

7. A turbo-electric power plant according to claim 6, which further comprises an annular manifold which surrounds and is in connection with said jet orifices and is provided with propellant fluid inlet means arranged to direct propellant fluid into said manifold substantially tangentially in the direction of rotation of said hollow rotor.

8. A turbo-electric power plant according to claim 7, in which said manifold continuously diminishes in cross-section in the direction of flow through a full 360 degrees.

9. A turbo-electric power plant according to claim 8, in which the end of the manifold at the 360 degree point is open so that propellant fluid can continue to flow around said annular member and all of said jet orifices are exposed to this continuous flow of propellant around said annular member.

10. A turbo-electric power plant according to claim 1, in which said jet orifices have their outermost surface tangential to the inner cylindrical surface of the annular channel, whereby a portion of the fluid is jetted tangentially into the space between said inner cylindrical surface and the apposed outer cylindrical surface of said hollow rotor and the blanace impinges on the latter surface.

11. In a turbo-electric power plant comprising an electric generator and a turbine driven by jetting in a low-temperature propellant fluid, the improvement in which the electric generator is disposed within said turbine with the stator and rotor elements thereof disposed in indirect heat exchange relation to the propellant fluid as it passes through said turbine.

12. In a process for generating electric power by means of a turbine-driven electric generator, the improvement which comprises disposing said generator within said turbine operating said turbine by passing a low-temperature propellant fluid in through said turbine in indirect jetting the propellant fluid into said turbine in heat exchange with the electricity-generating elements of said electric generator.

13. A process according to claim 12, in which the propellant fluid is an expandable unheated gas and the low temperature is obtained at least in part by expanding said unheated gas in said turbine.

14. A process according to claim 12, in which the propellant fluid is a hydraulic liquid and the low temperature is obtained by feeding said hydraulic liquid to the turbine at the ambient temperature.

15. A drag turbine for use in a turbo-electric power plant comprising
  (1) a stationary housing supported by a base member and having a smooth inner cylindrical surface;
  (2) a rotor mounted for rotation in said housing about the axis thereof and having a roughened outer cylindrical surface apposed to said smooth inner cylindrical surface;
  (3) a plurality of jet orifices in said housing oriented to jet propellant fluid into the space between said apposed surfaces in the direction of rotation of said rotor; and,
  (4) an annular manifold which surrounds and is in communication with said jet orifices and continuously diminishes in cross-section in the direction of flow throughout 360 degrees.

16. A drag turbine according to claim 15, in which the end of the manifold at the 360 degree point is open so that propellant fluid can continue to flow around said annular member and all of said jet orifices are exposed to this continuous flow of propellant around said annular member.

17. A drag turbine according to claim 16, in which the rotor is hollow and houses the rotor and stator elements of an electric generator.

18. A drag turbine according to claim 17, in which said rotor element is an annulus affixed to the outer inner periphery of the hollow rotor.

* * * * *